No. 716,811. Patented Dec. 23, 1902.
J. A. E. CRISWELL.
MACHINE FOR MAKING MATCHES.
(Application filed Jan. 2, 1901.)

(No Model.) 6 Sheets—Sheet 1.

Fig. 1.

WITNESSES: INVENTOR
William Foster. J. A. E. Criswell.
A. W. Stanley.

THE NORRIS PETERS CO., PHOTO-LITHO., WASHINGTON, D. C.

No. 716,811. Patented Dec. 23, 1902.
J. A. E. CRISWELL.
MACHINE FOR MAKING MATCHES.
(Application filed Jan. 2, 1901.)

(No Model.) 6 Sheets—Sheet 2.

WITNESSES: INVENTOR
William Foster J. A. E. Criswell
A. H. Stanley

No. 716,811. Patented Dec. 23, 1902.
J. A. E. CRISWELL.
MACHINE FOR MAKING MATCHES.
(Application filed Jan. 2, 1901.)
(No Model.) 6 Sheets—Sheet 3.

WITNESSES:
William Foster
A. W. Stanley

INVENTOR
J. A. E. Criswell

No. 716,811. Patented Dec. 23, 1902.
J. A. E. CRISWELL.
MACHINE FOR MAKING MATCHES.
(Application filed Jan. 2, 1901.)
(No Model.)  6 Sheets—Sheet 4.

WITNESSES:  INVENTOR

No. 716,811. Patented Dec. 23, 1902.
J. A. E. CRISWELL.
MACHINE FOR MAKING MATCHES.
(Application filed Jan. 2, 1901.)
(No Model.) 6 Sheets—Sheet 5.

WITNESSES:
William Foster
F. W. Stanley

INVENTOR
J. A. E. Criswell.

UNITED STATES PATENT OFFICE.

JAMES A. EKIN CRISWELL, OF NEW YORK, N. Y.

MACHINE FOR MAKING MATCHES.

SPECIFICATION forming part of Letters Patent No. 716,811, dated December 23, 1902.

Application filed January 2, 1901. Serial No. 41,813. (No model.)

*To all whom it may concern:*

Be it known that I, JAMES A. EKIN CRISWELL, of New York, county of Kings, and State of New York, have invented certain new and useful Improvements in Machines for Making Matches, of which the following is a full, clear, and exact description.

This invention relates to match-making machines, and more particularly to machines such as disclosed in my Patent No. 652,476, dated June 16, 1900, in which the splints are cut from blocks of wood.

The primary object of the invention is to provide a simple and efficient machine which is adapted to simply cut splints in large quantities to be assembled and the matches completed in another machine or machines, or which is adapted to cut the splints from blocks of wood and transfer the splints to a suitable carrier, into which they may be forcibly inserted.

Another object of the invention is to provide a simple and efficient machine in which the parts acting to produce and hold the splints have a rotary motion and may be moved continuously, so as to produce means by which the machine may be run at any desired speed, and thereby materially increase the output of the machine.

Other objects of the invention are to provide a continuously-moving rotary cutter-head having a series of sets of cutters which move at a given point adjacent to the blocks in a plane at right angles thereto in order to cut straight splints in large quantities and avoid the loss of time incident to machines in which the splints are cut by a reciprocatory motion and to provide simple and efficient means for transferring the splints from the cutters and positively forcing them into holding devices in a suitable carrier.

The invention will be hereinafter more particularly described with reference to the accompanying drawings, which form a part of this specification, and then pointed out in the claims at the end of the description.

In the drawings, Fig. 17 is a vertical section, partly in elevation, of the carrier or transfer means, taken on the line XVII XVII of Fig. 16.

Figure 1:
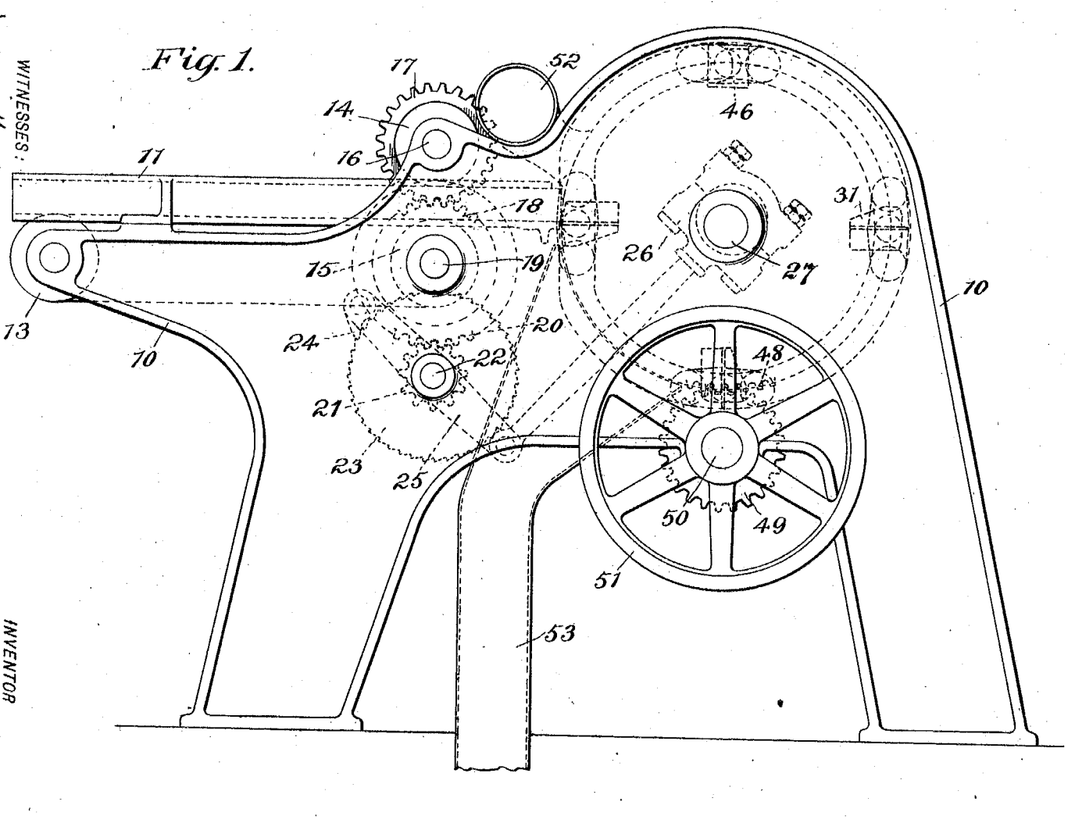
Figure 1 is a side elevation of one form of machine for cutting the splints.
Figure 2:
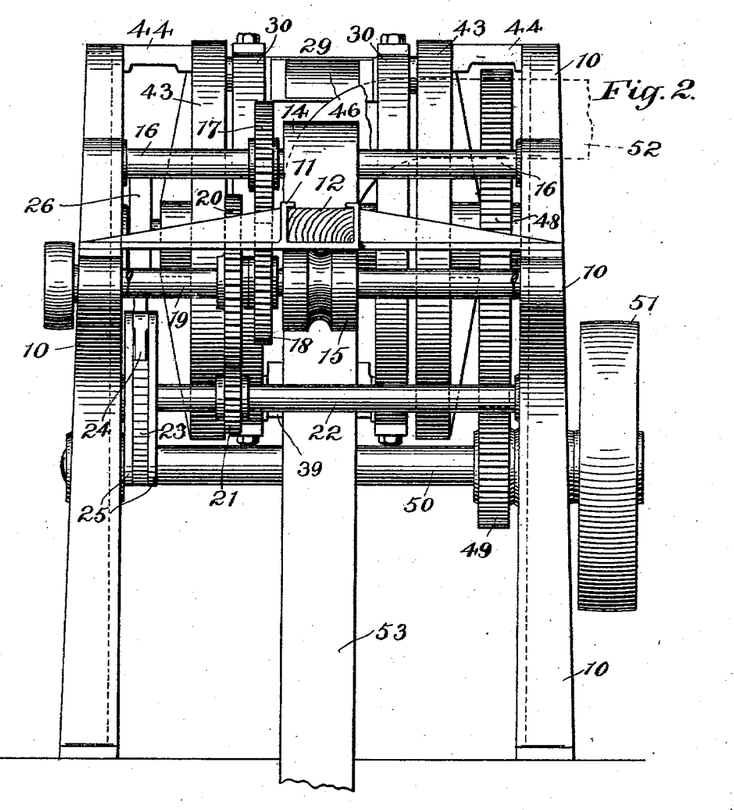
Fig. 2 is a front elevation, partly broken away.
Figure 3:
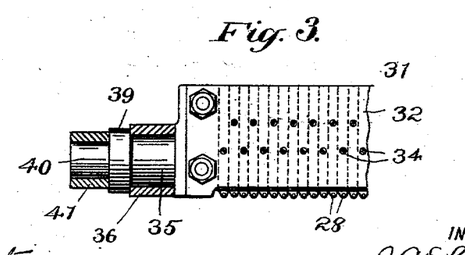
Fig. 3 is a transverse section through the cutter-head, taken on the line III III of Fig. 5.
Figure 4:
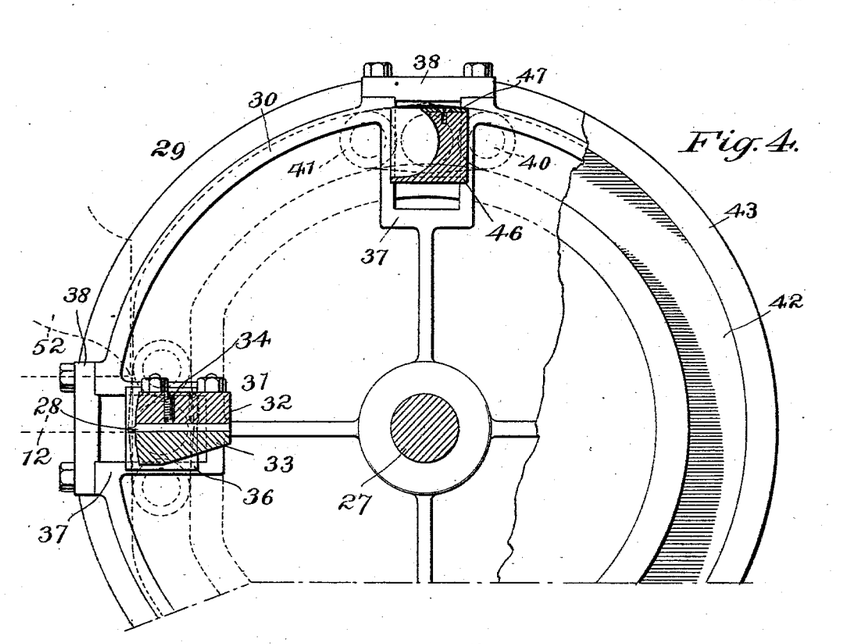
Fig. 4 is a fragmentary vertical section of the cutter-head, taken on the line IV IV of Fig. 5.

The frame 10, Figs. 1 and 2, may be of any suitable construction, and mounted upon the frame is a hopper 11, in which the blocks of wood 12 are placed. The blocks are fed along the hopper by the rolls 13 or by an endless belt to suitable feed-rolls 14 and 15. These rolls 14 and 15 are arranged on opposite sides of the blocks between which they are held, and the shaft 16 of the upper feed-roll 14 has a gear 17, which meshes with a gear 18 on the shaft 19 of the lower feed-roll. A gear 20 on the shaft 19 is in mesh with a gear or pinion 21 on the shaft 22, and on this latter shaft is a ratchet-wheel 23. The ratchet-wheel 23 is operated by a pawl 24, carried by rocking arms 25, and these latter arms are rocked or moved on the shaft 22 by an eccentric 26 on the rotary shaft 27. As the shaft 27 is rotated the ratchet-and-pawl mechanism will operate the rolls 14 and 15 and will feed the blocks of wood with an intermittent or step-by-step movement the proper distance and in the plane of the cutters 28 for cutting the splints.

Figures 5, 6, 7:
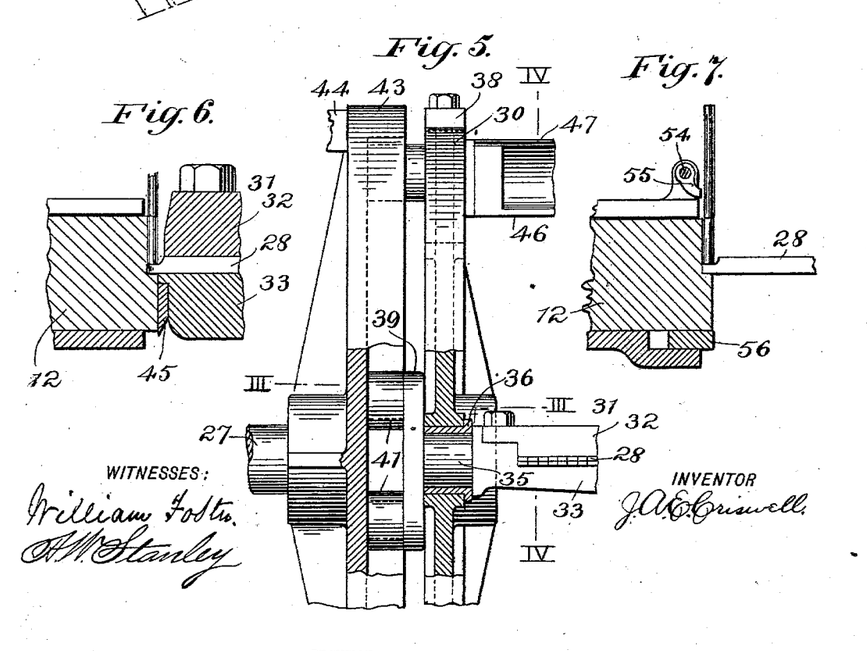
Fig. 5 is a fragmentary front elevation, partly in section, of the cutter-head and one of the stationary cams.
Fig. 6 is a fragmentary section showing how a trimming-knife may be held in advance of one or more of the sets of cutters.
Fig. 7 is a fragmentary section showing a sliding plate under the blocks and a device for initially moving the ejected splints.
Figure 8:
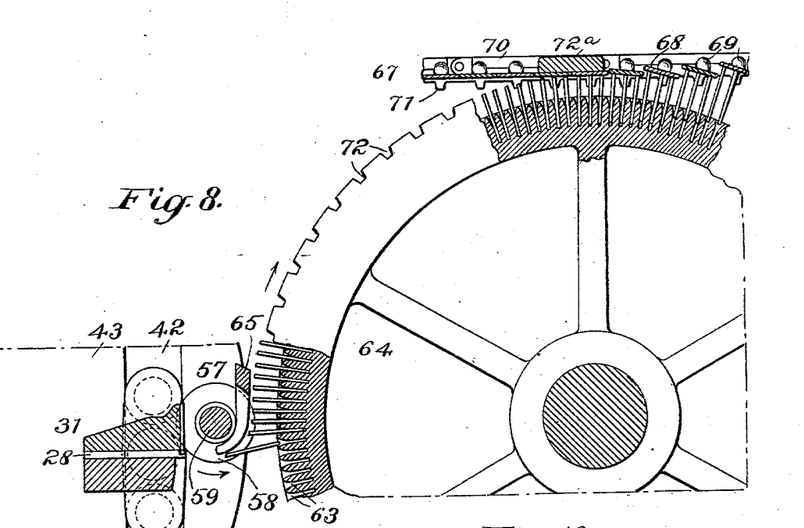
Fig. 8 is a fragmentary vertical section, partly in elevation, showing how the splints may be cut and then transferred and forcibly inserted into holding devices in a carrier.

For the purpose of cutting the splints and holding the cutters various means may be employed. As shown, a rotary head 29 is provided opposite the face of the blocks in the hopper. This head consists of two disks or wheels 30, fixed to the shaft 27, so as to rotate therewith, and held to move with the wheels 30 are the sets of cutters 28. There may be one or there may be several sets of cutters, and they may be of any suitable form to cut the splints. The machine shown is designed for three or four sets of cutters of the usual form, and each set is held in a device or cutter-bar 31. The bar 31 comprises two plates or members 32 and 33, between which the cutters are clamped, and each cutter is or may be adjustably held in the bar by set-screws 34 or otherwise. The cutter bars or devices 31 have trunnions 35, rotatably held in the boxes or bearings 36. These bearings are slidingly held in guides 37 in the wheels 30, the open ends of the guides being closed by the caps 38. On the outer ends of the cutter-bar trunnions 35 are arms 39, which project on opposite sides of and at substantially right angles to the plane of the cutters. A stud 40 projects from each end of each arm, and on the studs are rollers 41, which fit into a groove 42 in each of the cams or cam-wheels 43. The cams 43 are held stationary by the tie-plates 44, which are secured to the frame and to the cams, and the grooves 42 in the cams are at right angles to the plane of the blocks of wood 12 for a distance sufficient to permit the cutters to cut the splints in a right line, and for the remainder of the distance may be concentric to the shaft 27, as shown. The cutter-bar 31, arms 39, and rollers 41 form traveling and revolving independent carriages for the cutters, and the cams 43 form tracks and guides for the cutter-bars. As the shaft 27 and the wheels 30 rotate, the cutters and cutter-bars will be also rotated, and said cutters will be moved toward and from the center of rotation, according to the form of the grooves 43, and will cut the splints endwise and at right angles to the blocks, the splints being carried around by the cutters and ejected therefrom as the cutters again enter the blocks to cut another row or set of splints from the blocks, as best shown in Figs. 6 and 7. By this means the splints may be properly cut, and the splints may be cut at such a speed as to supply a number of other machines, which simply assemble the splints for completing the matches. In the form of machine shown the blocks of wood are fed parallel or substantially parallel with the longitudinal center of the machine, and each set of cutters is so arranged that it will cut a row of properly-spaced splints by the side of the set preceding, so that it will be only necessary to feed the blocks the proper distance after the several sets of the cutters have cut splints or after each revolution of the cutter-head, though instead of arranging the cutters and hoppers as shown there may be more than one hopper and the hopper or hoppers may be arranged at an angle with respect to the cutters, as is usual, and the successive sets of the latter may then follow in line. The cutter-bars may each or any of them be provided with a trimming-knife 45, as shown in Fig. 6, or a separate and independent bar 46 may be provided. This bar is in one piece and has a knife 47 secured thereto. Otherwise it is constructed and operated in the same manner as the cutter-bars 31. A gear 48 is secured to the cutter-head shaft 27 and meshes with a gear 49 on the main drive-shaft 50, on which shaft is the drive-pulley 51. The splints as they are ejected from the cutters are removed from the machine through the chute 52 to be handled as desired, and the waste is carried away from the machine through a chute or pipe 53, the mouth of which is adjacent to the cutter-head, and both chutes 48 and 49 may be connected to an exhaust-fan or to other means for causing the splints and other particles to pass through said chutes.

The invention thus far described will be readily understood from the foregoing description, when taken in connection with the accompanying drawings.

The drive-shaft 50 being operated, the gears 49 and 48 will rotate the shaft 27 and cutter-head 29, and through the eccentric 26 and ratchet-and-pawl mechanism the rolls 14 and 15 will feed the blocks 12 into the path of the cutters 28. The cutters will be guided by the grooves 42 in the stationary cams 43 and will cut the splints endwise from the blocks and will carry the splints around, so that they will be ejected as the cutters again enter the wood to cut splints.

In Fig. 7 a transverse rod 54, having fingers 55, is arranged over and transversely of the hopper and is adapted to be moved at the proper time to loosen any splints that might stick to the ends of those being cut, and beneath the blocks 12 is a sliding transverse plate 56, which is adapted to support the wood immediately beneath the cutters and which is moved clear of said cutters just prior to their reaching the plate. This latter feature assists in preventing the blocks splitting or the splints breaking away from the blocks until cut through by the cutters.

Figure 11:
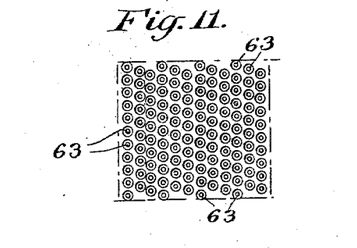
Fig. 11 is a diagrammatic view of one form of transfer device or carrier, showing one arrangement of holding devices.

The splints might be removed from the cutters and transferred to a carrier in various ways. As shown in Figs. 8 to 11, a transfer device 57 is provided. This transfer device consists of a roll of wedge-shaped circular disks 58, which are fixed to and rotate with the shaft or spindle 59. The shaft 59 is suitably supported adjacent to the path of movement of the cutters 28. The cutters are operated as already described; but in the construction shown the cutters and the head rotate in an opposite direction to that shown in the other views. The groove in the cam 43 is straight adjacent to the transfer device and similar to the groove adjacent to the blocks to cause the cutters to travel in a right line. A cam-rib 60 is formed on each wheel 30, and working on each side of the rib are the rollers 61, which are adapted to move the transfer device free of the cutters to permit them to pass and which immediately forces the wedging-disks toward the cutters and cutter-bar to cause the splints to be wedged between the disks, the cutter-bar being cut away to permit this. The spindle 59 is rotated by the gear 62 through any suitable mechanism and at a speed sufficiently slower than the movement of the cutters to remove the splints therefrom. As the transfer device rotates it will force the row or successive rows of splints into the holding devices 63 of a second transfer device or carrier 64. A comb or stripper 65 is arranged so that the splints cannot follow the clamping-disks 58, so as to be removed from the holding devices of the carrier after being inserted therein. The holding devices 63 in this case are holes drilled or formed in the periphery of the wheel or carrier 64, and said holes are arranged in rows, according to the position of the cutters, and may be made to follow in line or they may be staggered, as shown in Fig. 11. The carrier or transfer device 64 as it rotates will carry the splints away from the cutters and the roll 57 and will forcibly insert their ends into holding devices 66 in a second carrier 67. The carrier or the holding means in this or in any of the other forms may be of any suitable construction. The holding devices 66 are the usual holes and are arranged in rows in the plates 68. These plates are each provided with studs 69, which are held to rock in the side bars 70, the latter being hinged together to form an endless carrier. The endless belt or carrier or other holding means moves at the same speed as the wheel 64, and said carrier has teeth 71, adapted to enter recesses 72 in the wheel to cause the holes 66 to register with the holding devices 63 of the wheel or transfer device 64, and by which means the carrier is moved or is assisted in being moved. A plate 72ª or other means takes the thrust during the forcing of the splints into the carrier, and as the latter is moved along tangential to the wheel 64 the plates 68 will rock on their pivots and will withdraw the splints from the holding devices of the drum. By this means the cutter-head, transfer means, and the carrier may be moved continuously.

In this application match machinery in which the splints are cut, transferred endwise, and properly held by a dipping-carrier or holding means and the parts constructed to operate continuously, as also a movable transfer "carrier" in combination with certain other features, is broadly claimed herein, while match machinery that cuts, separates the cut splints, and transfers the separated splints endwise to a dipping-carrier, and the parts operated continuously, as also the separable features of the splints by rotary means, that either forces or does not of itself force the splints into the dipping-carrier, is claimed broadly in my pending application, Serial No. 40,001, filed December 15, 1900.

Any suitable timing mechanism may be employed to operate the several parts, and the matches might be completed and handled in the usual or in any preferred manner.

Figure 9:
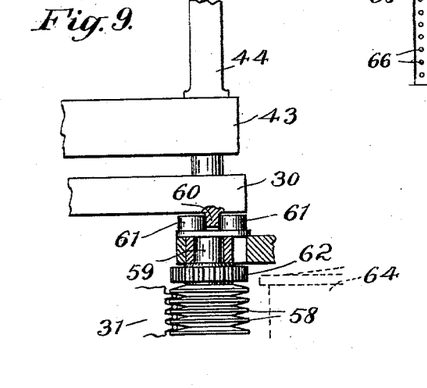
Fig. 9 is a fragmentary plan view, partly in section, of the mechanism shown in Fig. 8.
Figure 10:
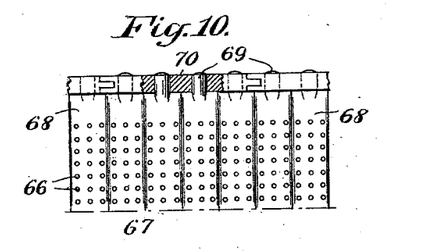
Fig. 10 is a fragmentary plan, partly in section, of one form of carrier.
Figure 12:
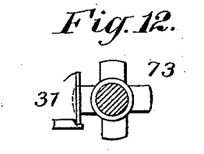
Fig. 12 is a section of a slightly-different form of device for removing splints from the cutters and inserting them into the holding devices of the rotating carrier.
Figure 13:
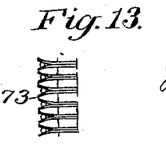
Fig. 13 is a fragmentary plan view of the device shown in Fig. 12.

The transfer device 73 (shown in Figs. 12 and 13) is substantially the same as in Fig. 9, except that portions are cut away, and its movement is so timed that the shaft or spindle and the clamping means need not be moved away to permit the cutters to pass.

Figure 14:
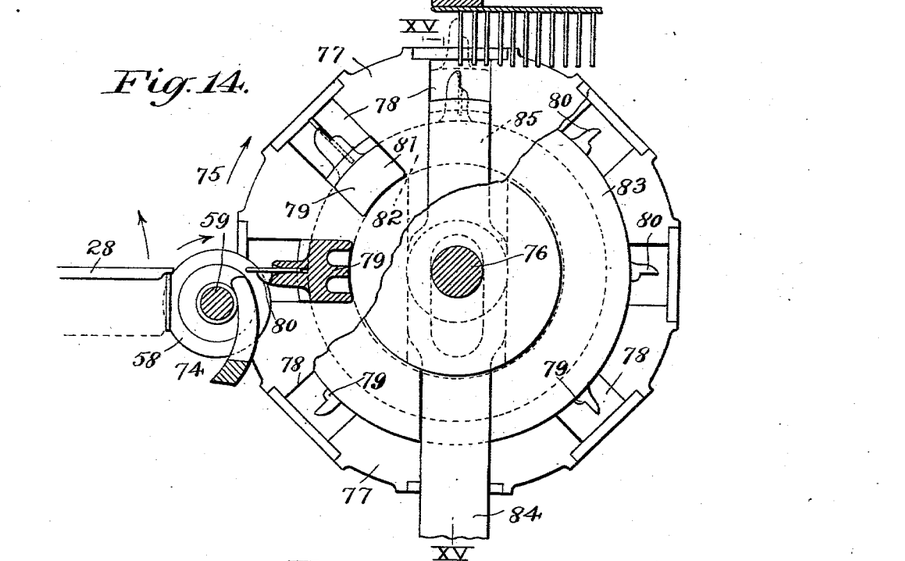
Fig. 14 is a vertical section, partly in elevation, showing different means for transferring the splints from the cutters to the carrier or holding means.
Figure 15:
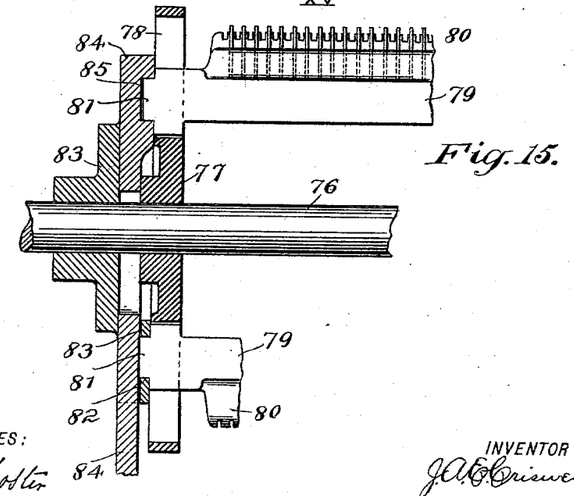
Fig. 15 is a vertical section taken on the line XV XV of Fig. 14.

In Figs. 14 and 15 another form of transfer means or carrier is shown. In this case the cutters are arranged and operated as in Figs. 1 to 6, and the transfer device 74 is the same as already described, except that it rotates in the opposite direction to the device 57. The second transfer device or carrier 75 has a rotary shaft 76, to which are secured the disks or wheels 77. These disks have a series of radial slots 78, which form guides for the slides 79. These slides have splint-holding devices in the form of radial holes into which the splints are forced by the transfer device 74. The splints may be supported for a greater distance on one side than the other, as by the lip 80, and each slide has projecting ends 81, which normally move in annular grooves 82 in the stationary rings or flanges 83. Each ring or flange 83 has a vertical slot therethrough in which is adapted to move a lever 84. This lever has a slot to permit it to span the shaft and to receive vertical movement, and said lever has a groove or slot 85 therein corresponding to the groove 82 of the stationary flange or ring 83. The groove 85 in each of the levers 84 normally registers with the groove 82 of each ring 83, and as the slides are moved by the wheels the projecting ends 81 will pass into the grooves 85 of the levers. By moving the levers vertically the slide having its ends in the grooves of said levers will be forced upward and will insert the splints into the holding devices of the carrier and on its downward movement will carry the slide away from the splints. The transfer device or carrier 75 is moved intermittently by any suitable mechanism, and as the slides receive the splints, as already described, they will be forced around or rotated by and with the wheels 77. The ends of the slides will be guided in the grooves 82 of the stationary rings, and as the slides reach a vertical position the ends 81 will enter the grooves 85 of the bars. These bars—one on each side—will then be given a quick upward movement which will force the splints into the second carrier, and the bars will return the slide to its former position. The carrier or transfer device is rotated again, so as to bring the next slide, with its splints, in position to be forced upward by the bars, and this operation is repeated so long as the machine continues to run. With the transfer device 77 the carrier or holding means need not have pivoted or rocking plates and may be variously constructed.

Figure 16:
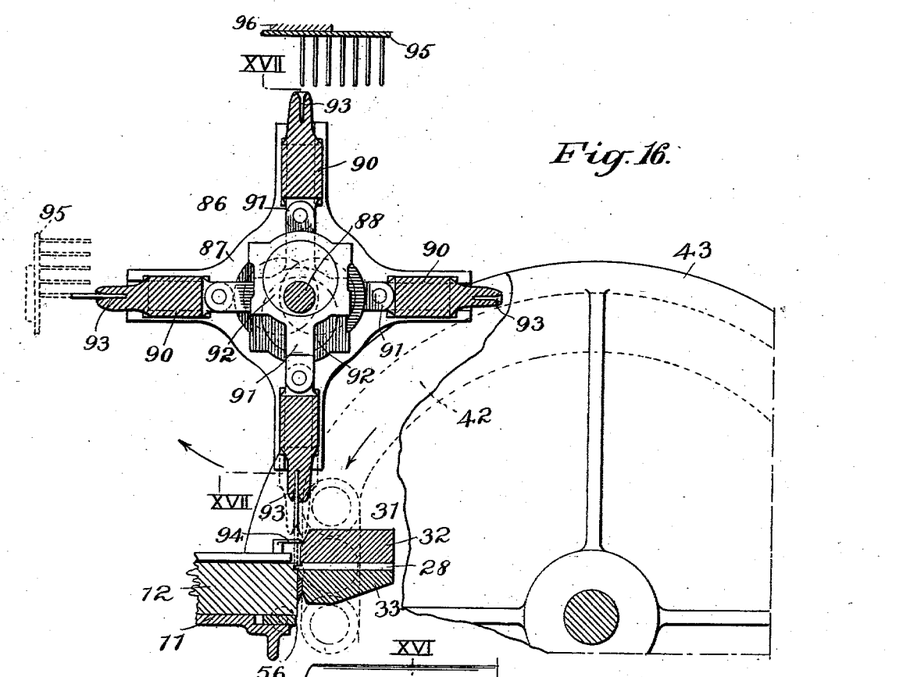
Fig. 16 is a fragmentary vertical section, partly in elevation, of another means for transferring the splints, taken on the line XVI XVI of Fig. 17.
Figure 17:
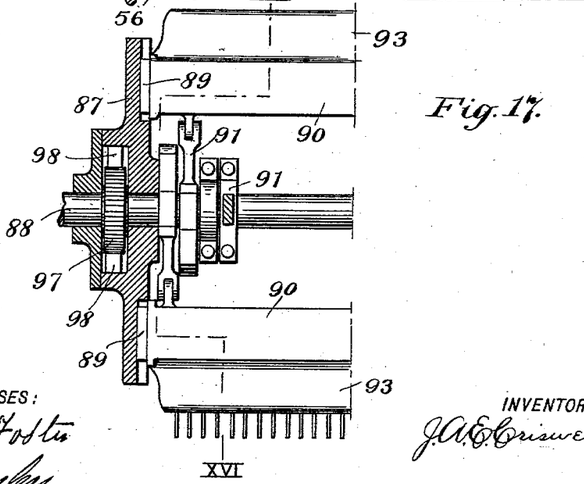

Instead of the chute 56 for carrying the splints away from the machine a transfer device or carrier 86 may be made to receive the splints as they are ejected and to force the splints into a second carrier, as shown in Figs. 16 and 17. This transfer device or carrier 86 comprises the disks 87, which are loosely held on the shaft 88. These disks have outwardly-projecting arms, which are slotted to receive the ends 89 of the slides 90. The slides are guided in the slots of the disks, and each slide is connected to the shaft 88 by two straps 91 of the eccentrics 92 and in such a manner that all of the slides will be moved toward or from the center of rotation when the shaft 88 is independently operated, as will be presently described. As in Figs. 14 and 15, the operating mechanism of one side only of the slides is shown; but it will be understood that the other ends of the slides may be similarly supported and operated. The intermittent movement of the transfer device is effected by any suitable mechanism and is so timed with respect to the rotary movement of the cutters that one of the slides will immediately follow each set of cutters. Each slide is provided with holding devices 93, into which the splints are forced. These holding devices are so formed as to grip the splints with a hold tight enough to carry them away from the cutters, but not too tight for discharging the splints. A series of light spring-fingers 94 may be arranged over the hopper 11, adapted to hold the splints upright as they are ejected by the cutters, but so constructed as not to interfere with the cutters. As the set of cutters, with the previously-cut splints, enters the blocks to cut a second set those previously cut will be ejected, and immediately this takes place or evenly slightly preceding it the shaft 88 is given a quick independent rotary movement of just one revolution. This causes the holding devices of the slide over the blocks to move down and grip the splints and then move up again. A quarter-revolution is then given the carrier or transfer device, and a second revolution is given the shaft 88, and this operation is repeated until the slide with splints is immediately under the holding devices in a second carrier 95. At each stroke of one of the slides to receive and withdraw the splints just ejected the slide diametrically opposite will force the splints into the holding devices of the carrier and will be withdrawn, so as not to interfere with those previously forced into the carrier when the slides are rotated, a plate 96 or other means being provided to take up the thrust while the slides are forcing the splints into the carrier 95. The shaft 88 has a ratchet-wheel 97, arranged within a recess formed by the boss 98 on the disks 87. The teeth of the ratchet-wheel are engaged by a pawl or series of pawls 98, so that both shaft and disks will rotate in unison, but which will permit the shaft to have an independent movement. This feature, as well as the mechanism for rotating the transfer device and the shaft, may be of any suitable construction.

Intermittent movable and reciprocatory transfer means of the character shown in Figs. 14 to 17 are fully described and claimed in various relations and different constructions and combinations in my pending applications, Serial No. 55,275, filed April 11, 1901; Serial No. 41,818, filed January 28, 1901; Serial No. 54,618, filed April 6, 1901, and Serial No. 77,224, filed October 1, 1901.

Instead of the splints being carried one-half a revolution of the transfer device 86 and then forced into the carrier 95 the latter may be located as indicated in dotted lines in Fig. 16. The splints in this case will be carried only one-quarter of a revolution and then forced into the carrier.

It will be understood that the parts spoken of as operated continuously may be operated intermittently, or vice versa, where possible, and that some of the parts referred to might be dispensed with where desired or others substituted therefor, or some of the parts might be used with other machines.

The splints might in some instances be cut in a close or closer row than shown and then further separated or separated into independent rows before being held to have the matches completed, and though round or so-called "round" splints are referred to these may vary as desired.

Independently-operated means might be used for ejecting the splints from the cutters and instead of the fixed jaws forming the holding devices of the slides 79 and 90 either one or both may be yielding or pivoted and in both receiving and discharging the jaws might be opened or closed automatically.

Having thus described my invention, I claim as new and desire to secure by Letters Patent—

1. The combination with a rotary head having a series of independent and revoluble cutter-bars each provided with means for cutting the splints endwise from the material and each movable parallel to the face of the wood and in a direct line while cutting the splints, and means for revolving the cutter-bars.

2. In a machine for making matches, the combination with means for holding blocks of wood, of a cutter-bar having a row or line of cutters cutting the splints endwise from the blocks, annular guides or tracks which fix the position of the cutters and which have a straight portion parallel to the face of the blocks to cause the cutters to cut the splints in a right line, and means in which the cutter-bar is slidingly held for forcing the cutters around the track or guide, for the purpose set forth.

3. In a machine for making matches, the combination with means for holding blocks of wood, of a cutter-bar or device having a row or line of cutters cutting the splints endwise from the blocks, guides or tracks which fix the position of the cutters and which have a straight portion parallel to the face of the blocks to cause the cutters to cut the splints in a right line, and rotating wheels in which the cutter-bar is slidingly held and which forces the cutter-bar around the track.

4. In a cutting device, the combination with a cutter-bar having means for cutting wood, of stationary cams forming guides or tracks which fix the position of the cutter-bar and which have a straight portion parallel to the face of the wood to cause the cutting means to cut in a right line, and rotary means in which the cutter-bar is slidingly held for forcing the bar around the track or guide, for the purpose set forth.

5. In a cutting device, the combination of a rotating bar having means for cutting wood, stationary cams forming guides or tracks which fix the position of the cutter-bar and which have a straight portion parallel to the face of the wood to cause the cutting means to cut in a right line, and rotating wheels in which the bar is slidingly held for forcing the bar around the track or guide, for the purpose set forth.

6. In a cutting device, the combination of a series of independent cutter-bars each having a series of cutters, circular guides or tracks which fix the position of the cutters and which have a straight portion parallel to the face of the material to cause the cutters to cut in a right line, and rotary means in which the cutter-bars are slidingly held for forcing the bars around the guides or tracks.

7. In a machine for making matches, the combination with means for holding blocks of wood, of a rotary head having a series of independent and revoluble cutter-bars each provided with cutters for cutting the splints endwise from the material and each movable parallel to the face of the material and in a direct line while cutting the splints, and means for revolving the cutter-bars.

8. In a machine for making matches, the combination with means for holding the splint material, of a revoluble cutter-bar provided with a series of cutters cutting the splints endwise from the material and movable parallel to the face of the material and in a direct line while cutting the splints, and means for revolving the cutter-bar.

9. In a match-making machine, the combination with series of independent cutter-bars each having a series of cutters, guides or tracks in which the ends of the cutter-bars ride and which fix the position of the cutters, said guides having a straight portion parallel to the face of the wood to cause the cutters to cut in a right line, and rotary means in which the cutter-bars are slidably held for forcing the bars around the guides or tracks.

10. In a match-making machine, the combination with means for holding the splint material, of a cutter-bar having cutters for cutting the splints endwise from the material, arms arranged on each side of the cutter-bar, rolls carried by the arms, annular guides or tracks against which the rolls rest and which fix the position of the cutters and bars, said guides or tracks having a straight portion parallel to the face of the wood to cause the cutters to cut in a right line, and means for forcing the cutter-bar along the tracks or guides.

11. In a match-making machine, the combination with means for holding the splint material, of a series of independent cutter-bars each having a row of cutters spaced apart and adapted to cut the splints endwise from the material, arms projecting outward from the ends of each cutter-bar, annular guides or tracks along which the arms are adapted to travel and which fix the position of the cutters in the bars, said tracks having a straight portion parallel to the face of the wood to cause the cutters to cut in a right line, and means for forcing the cutter-bars along the tracks or guides.

12. In a match-making machine, the combination with means for holding the splint material, of a cutter-bar having cutters for cutting the splints endwise from the material, arms arranged on each side of the cutter-bar, rolls carried by the arms, guides or tracks against which the rolls rest and which fix the position of the cutters and bars, said guides or tracks having a straight portion parallel to the face of the wood to cause the cutters to cut in a right line, and rotary means in which the cutter-bar is slidingly held for forcing the latter around the guides or tracks.

13. In a match-making machine, the combination with means for holding the splint material, of a series of independent cutter-bars each having a row of cutters spaced apart and adapted to cut the splints endwise from the material, arms projecting outward from the ends of each cutter-bar, annular guides or tracks along which the arms are adapted to travel and which fix the position of the cutters and the bar, said tracks having a straight portion parallel to the face of the wood to cause the cutters to cut in a right line, and means for forcing the cutter-bar along the tracks or guides.

14. In a match-making machine, the combination with means for holding the splint material, of a cutter-bar having cutters for cutting the splints endwise from the material, arms arranged on each side of the cutter-bar, rolls carried by the arms, cams having grooves forming guides or tracks against which the rolls rest and which fix the position of the cutters and bars, said guides or tracks having a straight portion parallel to the face of the wood to cause the cutters to cut in a right line, and rotating means for revolving the cutter-bar and forcing the latter along the tracks or guides.

15. In a match-making machine, the combination with means for holding the splint material, of a series of independent cutter-bars each having a row of cutters spaced apart and adapted to cut the splints endwise from the material, arms projecting outward from the ends of each cutter-bar, cams having grooves forming guides or tracks along which the arms are adapted to travel and which fix the position of the cutters and the bars, said tracks having a straight portion parallel to the face of the wood to cause the cutters to cut in a right line, rotating wheels in which the bars are slidingly held and for forcing the cutter-bar along the tracks or guides.

16. In a match-making machine, the combination with means for feeding blocks of wood, of a continuously-moving rotary head having cutters cutting the splints endwise in the direction of its rotation, holding means for the splints, and means for transferring the splints from the cutters to the holding means.

17. In a match-making machine, the combination with means for feeding blocks of wood, of a rotating head having cutters movable toward and from the center of rotation, means for rotating the head, holding means for the splints, and means for transferring the splints from the cutters to the holding means.

18. In a machine for making matches, the combination with means for feeding blocks of wood, of a continuously-rotating cutter-head having cutters spaced apart and movable toward and from the center of rotation, means for rotating the head, a carrier, and rotary means for transferring the splints from the cutter-head to the carrier.

19. In a machine for making matches, the combination with means for holding blocks of wood, of a rotary head having cutters cutting the splints endwise from the blocks, a carrier, and means independent of the cutter-head for transferring the splints from the cutters to the carrier, for the purpose set forth.

20. In a match-making machine, the combination with means for feeding blocks of wood, of a rotary head having more than one set of cutters movable around a fixed center and cutting the splints endwise from the blocks, means for rotating the head, holding means for the splints, and rotary means for transferring the splints from the cutters to the holding means, for the purpose set forth.

21. In a match-making machine, the combination with means for feeding the splint material, of a rotary head having more than one set of cutters for cutting splints each movable toward and from the center of rotation, a carrier, and rotary means for transferring the splints from the cutters to the carrier.

22. In a match-making machine, the combination with a rotary head having cutters for cutting the splints endwise and spaced apart, a carrier, and rotary means for transferring the splints from the cutters and for forcibly inserting them into the carrier.

23. In a match-making machine, the combination with means for feeding the splint material, of a rotary head having more than one set of cutters for cutting the splints, a carrier, and rotary means for transferring the splints from the cutters and for forcibly inserting them into the carrier.

24. In a match-making machine, the combination with means for feeding blocks of wood, of a rotary head having more than one set of cutters for cutting splints, each movable toward and from its center of rotation, a carrier having splint-holding means receiving the splints endwise after being cut, and a second carrier receiving the splints from the first-mentioned carrier.

25. In a match-making machine, the combination with a rotary head having bodily-movable cutting means moving toward the splint material and cutting splints therefrom, a carrier having means receiving the splints endwise after being cut, and a second dipping-carrier receiving the splints from the first-mentioned carrier while held by said latter carrier.

26. In a machine for making matches, the combination with means for feeding blocks of wood, of a rotary cutter-head having cutters cutting the splints endwise from the blocks and movable around a fixed center, a carrier having splint-holding means receiving the splints endwise after being cut, and a second carrier receiving the splints from the first-mentioned carrier.

27. In a machine for making matches, the combination with means for feeding blocks of wood, of a rotary cutter-head having more than one set of cutters cutting the splints endwise from the blocks and movable around a fixed center, a carrier having splint-holding means receiving the successive sets of splints endwise after being cut, and a second carrier receiving the splints from the first-mentioned carrier, substantially as and for the purpose described.

28. In a machine for making matches, the combination with a rotary cutter-head having more than one set of cutters movable toward and from the center of rotation, a carrier having more than one set of holding devices receiving the successive set of splints after being cut, and a second carrier receiving the splints from the first-mentioned carrier.

29. In a machine for making matches, the combination with a rotary cutter-head having cutters for cutting splints and movable toward and from the center of rotation, a carrier, and a second carrier receiving the splints endwise and forcibly inserting them into the first-mentioned carrier.

30. In a machine for making matches, the combination with means for feeding blocks of wood, of a rotary cutter-head having cutters spaced apart and each cutting an independent splint endwise from the block while rotating around a fixed center, a carrier having splint-holding means receiving the splints endwise after being cut, a second carrier having splint-holding devices, and means for causing the first-mentioned carrier to forcibly insert the splints into the holding devices of the second carrier.

31. In a match-making machine, the combination with means for feeding blocks of wood, of a rotary cutter-head having cutters spaced apart and each cutting an individual splint endwise from the block while rotating around a fixed center, the cutters being movable toward and from the center and cutting at right angles to the plane of the blocks, a carrier having splint-holding means receiving the splints properly spaced endwise after being cut, a second carrier having splint-holding devices, and means for causing the first-mentioned carrier to forcibly insert the splints into the holding devices of the second carrier, for the purpose set forth.

32. In a machine for making matches, the combination with means for feeding blocks of wood, of a rotary cutter-head having cutters cutting a row of splints properly spaced apart while rotating around a fixed center, a carrier having a series of independent holding means for successive rows of splints, a second carrier having splint-holding devices, and means for causing the first-mentioned carrier to forcibly insert the successive rows of splints into the holding devices of the second carrier.

33. In a machine for making matches, the combination with means for feeding blocks of wood, of a rotary cutter-head having more than one set of cutters each cutting a row of splints endwise and properly spaced apart while rotating around a fixed center, a carrier having independent splint-holding means receiving the splints endwise after being cut, a second carrier having splint-holding devices, and means for causing the first-mentioned carrier to forcibly insert the successive rows of splints into the holding devices of the second carrier, substantially as and for the purpose described.

34. In a machine for making matches, the combination with means for feeding blocks of wood, of a rotary cutter-head having cutters movable toward and from the center of rotation and cutting a row of splints properly spaced apart, a carrier having splint-holding means receiving the splints endwise after being cut, a second carrier having splint-holding devices, and means for causing the first-mentioned carrier to forcibly insert the splints into the holding devices of the second carrier.

35. In a match-making machine, the combination with means for feeding blocks of wood, of a rotary cutter-head having a series of sets of cutters each movable toward and from the center of rotation and cutting a row of splints properly spaced apart, a rotary carrier having splint-holding means receiving the splints endwise after being cut, a second carrier having splint-holding devices, and means for causing the splints to be forced into the holding devices of the second carrier.

36. In a match-making machine, the combination with means for feeding blocks of wood, of a rotary cutter-head having more than one set of cutters each movable toward and from and around a fixed center, and cutting a row of splints properly spaced apart and at right angles to the plane of the blocks, a rotary carrier having a series of splint-holding means receiving the successive rows of splints endwise after being cut, a second carrier having splint-holding devices, and means for causing the first-mentioned carrier to forcibly insert the splints into the holding devices of the second carrier, substantially as and for the purpose described.

37. In a match-making machine, the combination with splint-cutting means, cutting the splints in a single row and properly separated, of a movable transfer-carrier adapted and operated to receive successively and hold more than one row of splints at the same time and carry them away from the cutting means, and a holding-carrier receiving the splints direct from the transfer-carrier.

38. In a match-making machine, the combination with a continuously-moving rotary carrier receiving and holding successive rows of splints, means for supplying the rows of splints properly separated, and a second carrier moving at the same speed as the first-mentioned carrier and receiving the splints direct therefrom.

39. In a match-making machine, the combination with a rotary carrier having holding devices for the splints, of rotary splint-cutting means, a rotary carrier, a rotary transfer device receiving the splints from the cutting means and forcing them endwise into the carrier, and holding means for the splints, all of which have a continuous motion for the purpose set forth.

40. In a match-making machine, the combination with a continuously-moving rotary carrier having holding devices for the splints, of a rotary splint-cutting means cutting the splints separated and in single rows, a rotary carrier having holding devices, adapted to receive and hold the splints endwise, a rotary transfer device receiving the splints from the cutting means and forcibly inserting them endwise into the holding devices of the carrier, and a second carrier receiving the splints from the first-mentioned carrier, all of which parts have a continuous motion for the purpose set forth.

41. In match-making machinery, the combination with splint-cutting means, of continuously and positively moving means receiving the splints endwise in rows and moving the rows bodily at once, means for positively and continuously moving the rotary means, and a dipping-carrier for the splints receiving the latter from the rotary means.

42. In match-making machinery, the combination with continuously-moving rotary means receiving splints endwise and moving the whole splint bodily at once, means for supplying splints, and a dipping-carrier positively movable with and receiving the splints endwise from the rotary means.

43. In match-making machinery, the combination with splint-cutting means, of continuously-moving rotary means receiving the splints endwise, and continuously-moving dipping-carrier moving in a plane tangential to the rotary means receiving the splints endwise in independent rows direct from the said continuously-moving rotary means.

44. In a match-making machine, the combination with a source of supply for the splints, of a continuously and positively moving carrier receiving a number of single rows of splints endwise and moving the rows, and a continuously and positively moving dipping-carrier moving in the same direction and at the same speed as the rotary carrier and receiving the splints endwise in independent rows direct from said rotary carrier.

45. In match-making machinery, the combination with rotary means for supplying splints, of a positively and continuously moving rotary carrier receiving the splints endwise and in rows and moving the rows, and a second or dipping carrier positively movable in the same direction and at the same speed as the rows and receiving the independent rows of splints direct from said rotary carrier.

46. In match-making machinery, the combination with a source of supply for splints, of continuously-moving rotary means receiving the splints endwise in rows and moving the rows bodily at once, and a dipping-carrier positively moving in the same direction and at the same speed as the rows and into which the rows are positively forced by the continuously-moving rotary means.

J. A. EKIN CRISWELL.

Witnesses:
WILLIAM FOSTER,
A. W. STANLEY.